March 8, 1927.

F. A. LIND

TIRE HOLDER

Filed Aug. 10, 1923

1,620,478

INVENTOR
FREDERICK A. LIND
BY
ATTORNEY

Patented Mar. 8, 1927.

1,620,478

UNITED STATES PATENT OFFICE.

FREDERICK A. LIND, OF AKRON, OHIO, ASSIGNOR TO THE GOODYEAR TIRE & RUBBER COMPANY, OF AKRON, OHIO, A CORPORATION OF OHIO.

TIRE HOLDER.

Application filed August 10, 1923. Serial No. 656,663.

My invention relates to means for supporting tires in an upright position for the purpose of displaying them in sales rooms, display windows, and the like.

The object of my invention consists in providing a relatively inexpensive tire holder which will securely hold the tire in the proper position and which will not mar the surface upon which it rests.

Heretofore, certain types of tire holders have been provided which consist of two separate units each comprising a side member and two end members. The end members consist of a leg portion, a tire clamping portion, and an offset portion which extends substantially perpendicular to the leg and tire clamping portions and which is pivotally connected to a cooperating end member of the cooperating unit.

In the aforementioned type of tire rack, when the weight of the tire is disposed upon the offset pivotally connected arms, the leg portions are caused to spread and the clamping portions to engage the sides of the tire. The weight of the tire causes the leg portions to engage the surface upon which they are resting with considerable force, thus opposing the spreading thereof and likewise the clamping of the tire.

Also, the spreading of the legs with the weight of the tire imposed thereon frequently mars the surface upon which they rest, particularly when used on the highly polished floor of a display window.

By my invention, I have eliminated the aforementioned objection by so constructing my device that the leg portions may roll upon the surface upon which they rest, but cannot slide. As no resistance is offered to movement of the legs there is no force tending to oppose or decrease the clamping action on the tire sides.

Figure 1:
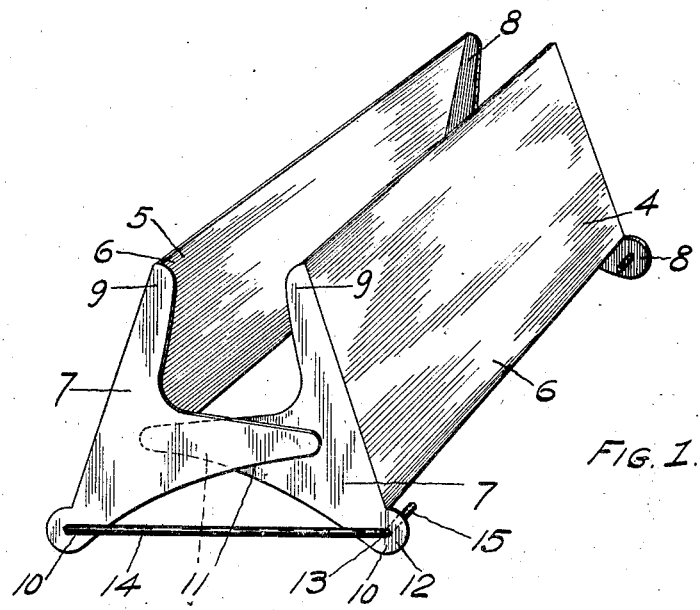
Figure 2:
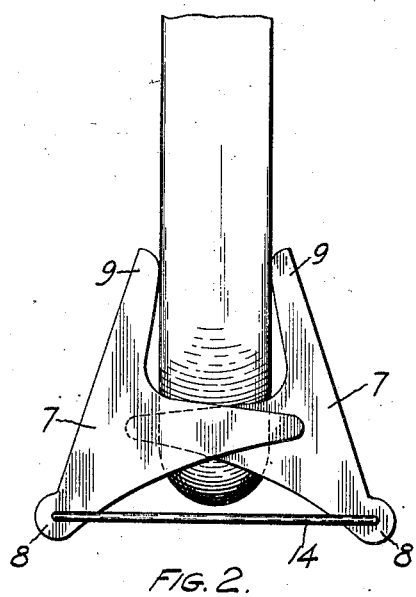

For a more detailed description and better understanding of my invention reference may now be had to the accompanying drawings of which:

Fig. 1 is a perspective view of a tire rack constructed in accordance with my invention; and Fig. 2 is an end elevational view of a similar rack supporting a tire.

The tire rack consists of two separate units 4 and 5, each of which comprises a side member 6, which may be used for advertising purposes, attached to two similar end members 7 and 8. The member 6 may, if desired, be composed of card board, but it is preferred that the members 7 and 8 be constructed of a more rigid material such as wood. Each of the end members 7 and 8 consists of an upper or clamping arm 9, and a lower or leg portion 10, and an offset weight supporting portion 11. The leg member 10 is provided with an arcuate floor engaging surface 12, and an opening 13 disposed at the center thereof. The two units are connected together by means of a relatively rigid wire member 14, which is provided with end projections 15 disposed at right angles to the main body portion thereof and which enter the openings 13, thus pivotally connecting the cooperating end members 7. A similar wire member connects the end members 8.

From the foregoing description, it will be apparent that, when the weight of a tire is placed upon the members 11, both units 4 and 5 are free to rock about the centers of the ends of the leg portions, thus preventing any scraping or scratching of the surface upon which they rest. Also since these members are free to rock in the manner described, no opposition is offered to the entire weight of the tire beng employed to produce a strong clamping action in the members 9.

Although I have illustrated but a single form of my invention, and have described in detail but a single application thereof, it will be apparent to those skilled in the art, that it is not so limited but that various minor modifications and changes may be made therein without departing from the spirit of my invention or from the scope of the appended claims.

What I claim is:

1. A tire holder consisting of two substantially similar units each comprising a side member and two end members disposed substantially normally thereto, each of said end members being provided with a tire clamping portion, a weight supporting portion, and a supporting leg portion at the lower extremity thereof having an arcuate end portion, and means pivotally attached to the centers of the arcs formed by the end portions to connect the two units.

2. A tire holder consisting of two substantially similar units each comprising a side member and two end members disposed substantially normally thereto, each of said end members being provided with a clamping portion, a weight supporting portion, and a leg portion having an arcuate end portion provided with an opening at the center thereof, and relatively rigid wire members connecting the units by means of end portions of the wire bent at right angles to the main body portion thereof and extending into the openings in the said leg portions.

In witness whereof, I have hereunto signed my name.

FREDERICK A. LIND.